(12) United States Patent
Taslimi et al.

(10) Patent No.: US 11,765,104 B2
(45) Date of Patent: Sep. 19, 2023

(54) METHOD AND SYSTEM FOR CHATBOT-ENABLED WEB FORMS AND WORKFLOWS

(71) Applicant: Nintex Pty Ltd., Melbourne (AU)

(72) Inventors: Vahid Taslimi, Melbourne (AU); Manvik Kathuria, Melbourne (AU); Craig Harrowfield, Melbourne (AU)

(73) Assignee: Nintex Pty Ltd., Melbourne (AU)

(*) Notice: Subject to any disclaimer, the term of this patent is extended or adjusted under 35 U.S.C. 154(b) by 13 days.

(21) Appl. No.: 16/975,995

(22) PCT Filed: Feb. 26, 2019

(86) PCT No.: PCT/IB2019/051514
§ 371 (c)(1),
(2) Date: Aug. 26, 2020

(87) PCT Pub. No.: WO2019/162921
PCT Pub. Date: Aug. 29, 2019

(65) Prior Publication Data
US 2021/0044546 A1    Feb. 11, 2021

(30) Foreign Application Priority Data
Feb. 26, 2018  (AU) ............................... 2018900610

(51) Int. Cl.
*H04L 51/02* (2022.01)
*G10L 15/06* (2013.01)
*G10L 15/18* (2013.01)

(52) U.S. Cl.
CPC .............. *H04L 51/02* (2013.01); *G10L 15/06* (2013.01); *G10L 15/1822* (2013.01)

(58) Field of Classification Search
CPC ..... H04L 51/02; G10L 15/06; G10L 15/1822; G06F 40/174; G06F 40/35
USPC .......................................................... 704/231
See application file for complete search history.

(56) References Cited

U.S. PATENT DOCUMENTS

| 5,915,001 | A  | * | 6/1999 | Uppaluru | ................ | H04L 67/02 |
| | | | | | | 704/270.1 |
| 11,294,975 | B1 | * | 4/2022 | Devageorge | ............ | G10L 15/30 |
| 2003/0195751 | A1 | * | 10/2003 | Schwenke | ............... | G10L 15/30 |
| | | | | | | 704/E15.047 |
| 2005/0050093 | A1 | * | 3/2005 | Atkin | .................. | G06F 16/9537 |
| 2006/0007189 | A1 | * | 1/2006 | Gaines, III | ......... | G06V 30/1423 |
| | | | | | | 382/187 |
| 2008/0301313 | A1 | * | 12/2008 | Bhogal | ............... | H04L 61/4511 |
| | | | | | | 709/230 |

(Continued)

*Primary Examiner* — Thuykhanh Le
(74) *Attorney, Agent, or Firm* — Newman Du Wors LLP

(57) ABSTRACT

Systems and methods for creating chatbot-enabled web forms and workflows, the method comprising, mapping web forms and workflows to intents, wherein the web forms have required fields to be completed and the workflows have required tasks to be performed; mapping the required fields and the required tasks to entities for the intents that map to the web forms and the workflows; mapping utterances to complete the required fields and perform the required tasks to the intents and the entities that map to the web forms and the workflows; and creating chatbots configured to assist users to complete the required fields and perform the required tasks using the utterances, the intents and the entities that map to the web forms and the workflows.

11 Claims, 9 Drawing Sheets

(56) References Cited

U.S. PATENT DOCUMENTS

| | | | | |
|---|---|---|---|---|
| 2010/0104087 A1* | 4/2010 | Byrd | ............... | H04M 3/51 |
| | | | | 379/265.09 |
| 2011/0106779 A1* | 5/2011 | George | ............... | G06F 16/3329 |
| | | | | 715/224 |
| 2012/0136756 A1* | 5/2012 | Jitkoff | ............... | G06F 16/9577 |
| | | | | 715/224 |
| 2013/0290234 A1* | 10/2013 | Harris | ............... | G06Q 30/00 |
| | | | | 901/50 |
| 2014/0074550 A1* | 3/2014 | Chourey | ............... | G06Q 30/02 |
| | | | | 705/7.29 |
| 2014/0188585 A1* | 7/2014 | Thompson, Jr. | ... | G06Q 30/0214 |
| | | | | 705/14.16 |
| 2014/0257788 A1* | 9/2014 | Xiong | ............... | H04N 21/25875 |
| | | | | 704/235 |
| 2014/0258826 A1* | 9/2014 | Barrus | ............... | G06Q 10/0633 |
| | | | | 715/224 |
| 2014/0258828 A1* | 9/2014 | Lymer | ............... | G06F 40/174 |
| | | | | 715/224 |
| 2014/0365214 A1* | 12/2014 | Bayley | ............... | G06F 3/1454 |
| | | | | 704/235 |
| 2015/0039987 A1* | 2/2015 | Soulier | ............... | G06F 40/174 |
| | | | | 715/224 |
| 2015/0149168 A1* | 5/2015 | Stent | ............... | G10L 15/22 |
| | | | | 704/235 |
| 2015/0302855 A1* | 10/2015 | Kim | ............... | G10L 15/22 |
| | | | | 704/275 |
| 2016/0011905 A1* | 1/2016 | Mishra | ............... | G06Q 10/06 |
| | | | | 718/102 |
| 2016/0012465 A1* | 1/2016 | Sharp | ............... | G06Q 20/386 |
| | | | | 705/14.17 |
| 2017/0147554 A1* | 5/2017 | Chen | ............... | G06F 40/35 |
| 2017/0192950 A1* | 7/2017 | Gaither | ............... | G10L 15/22 |
| 2018/0302346 A1* | 10/2018 | Xie | ............... | H04L 67/02 |
| 2019/0082043 A1* | 3/2019 | Lavian | ............... | G06F 16/23 |
| 2019/0197103 A1* | 6/2019 | Kröner | ............... | G06F 40/284 |
| 2020/0372205 A1* | 11/2020 | Bradley | ............... | G06F 16/22 |
| 2021/0065121 A1* | 3/2021 | Brehmer | ............... | G06Q 10/107 |
| 2021/0174800 A1* | 6/2021 | Srinivasan | ............ | G16H 10/60 |

* cited by examiner

300

What sentences will people use to complete this form? (Utterances)

Enter some phrases that people would use to complete the form (Example: "I want to apply for leave next Monday to Wednesday")

Enter a sentence

[ I want to apply for it| ]

"I want to apply for leave from Monday to Friday"

"Put in sick leave for me"

"I want to go on holiday from next Monday to the end of the week"

Figure 3

METHOD AND SYSTEM FOR CHATBOT-ENABLED WEB FORMS AND WORKFLOWS

CROSS-REFERENCE TO RELATED APPLICATION(S)

This application claims priority to International Application No. PCT/IB2019/051514, filed Feb. 26, 2019, titled "Method and System for Chatbot-Enabled Web Forms and Workflows," which claims priority under 35 U.S.C. Section 119(e) to Australia Provisional Application 2018900610, filed Feb. 26, 2018, titled "Method and System for Chatbot-Enabled Web Forms and Workflows," the disclosure of which is incorporated by reference herein in its entirety.

TECHNICAL FIELD

The present invention relates to a method and system for chatbot-enabled web forms and workflows.

BACKGROUND

The present applicant has developed a number of no-code (or code-free), intuitive, drag-and-drop tools, such as Nintex® Forms and Nintex® Workflow, that enable non-coding business users to create, publish and manage web forms and business workflows without needing to code from scratch.

Chatbots are increasingly being used for various practical purposes, such as walking users through business processes. Implementing chatbots for business processes, however, typically involves significant coding effort that is beyond the capabilities of most non-coding business users.

It is desirable to provide intuitive, no-code solutions that enable non-coding business users to create and deploy chatbots (or artificial intelligence (AI) assistants) to assist users to complete web forms and perform workflows.

SUMMARY OF THE DISCLOSURE

According to the present invention, there is provided a method for creating chatbot-enabled web forms and workflows, the method comprising: mapping web forms and workflows to intents, wherein the web forms have required fields to be completed and the workflows have required tasks to be performed; mapping the required fields and the required tasks to entities for the intents that map to the web forms and the workflows; mapping utterances to complete the required fields and perform the required tasks to the intents and the entities that map to the web forms and the workflows; creating chatbots configured to assist users to complete the required fields and perform the required tasks using the utterances, the intents and the entities that map to the web forms and the workflows.

The chatbots may be further configured to assist the users to discover the web forms and the workflows based on recognizing the intents and the entities in the utterances.

The chatbots may be further configured to trigger the workflows and performance of the required tasks based on recognizing the intents and the entities in the utterances.

The chatbots may be further configured to confirm completion of the required fields and performance of the required tasks based on recognizing the intents and the entities in the utterances.

The method may further comprise mapping confirmation messages confirming completion of the required fields and performance of the required tasks to the intents and the entities that map to the web forms and the workflows.

The mapping of the intents, the entities, the utterances, and the confirmation messages to the web forms and the workflows may be performed using graphical user interfaces (GUI) without coding.

The present invention also provides a system for creating chatbot-enabled web forms and workflows, the system comprising: a memory to store instructions; one or more processors to execute instructions stored in the memory to: map web forms and workflows to intents, wherein the web forms have required fields to be completed and the workflows have required tasks to be performed; map the required fields and the required tasks to entities for the intents that map to the web forms and the workflows; map utterances to complete the required fields and perform the required tasks to the intents and the entities that map to the web forms and the workflows; create chatbots configured to assist users to complete the required fields and perform the required tasks using the utterances, the intents and the entities that map to the web forms and the workflows.

The present invention further provides a non-transitory machine-readable medium storing instructions which, when executed by one or more processors, cause the one or more processors to perform operations comprising: mapping web forms and workflows to intents, wherein the web forms have required fields to be completed and the workflows have required tasks to be performed; mapping the required fields and the required tasks to entities for the intents that map to the web forms and the workflows; mapping utterances to complete the required fields and perform the required tasks to the intents and the entities that map to the web forms and the workflows; creating chatbots configured to assist users to complete the required fields and perform the required tasks using the utterances, the intents and the entities that map to the web forms and the workflows.

The present invention also provides a chatbot for completing web forms or performing workflows created by the method or the system described above.

The present invention further provides a chatbot-enabled web form or a chatbot-enabled workflow created by the method or the system described above.

BRIEF DESCRIPTION OF THE DRAWINGS

Embodiments of the invention will now be described by way of example only with reference to the accompanying drawings, in which:

FIGS. 2 to 4 are example GUIs generated by an example chatbot creation engine for creating chatbots for web forms and workflows according to an example embodiment of the present invention;

DETAILED DESCRIPTION OF EMBODIMENTS

The terms used in this specification generally have their ordinary, conventional meanings in the fields of natural language processing, web forms and business workflows. For example, the term "required field" means that the field is required based on whatever business rule is in place at the time. For a web form, a field may be required because the form designer enable a flag to say required, or it could be based on a business rule (defined in the form or workflow) that makes a filed required for capturing input from the end user. Similarly, a "task" means any action that requires user input. For example, if there is a workflow and a question is asked or user input is required, then that is considered a task. The workflow will pause until the user responds or until a predefined timeout without any response.

Figure 1:
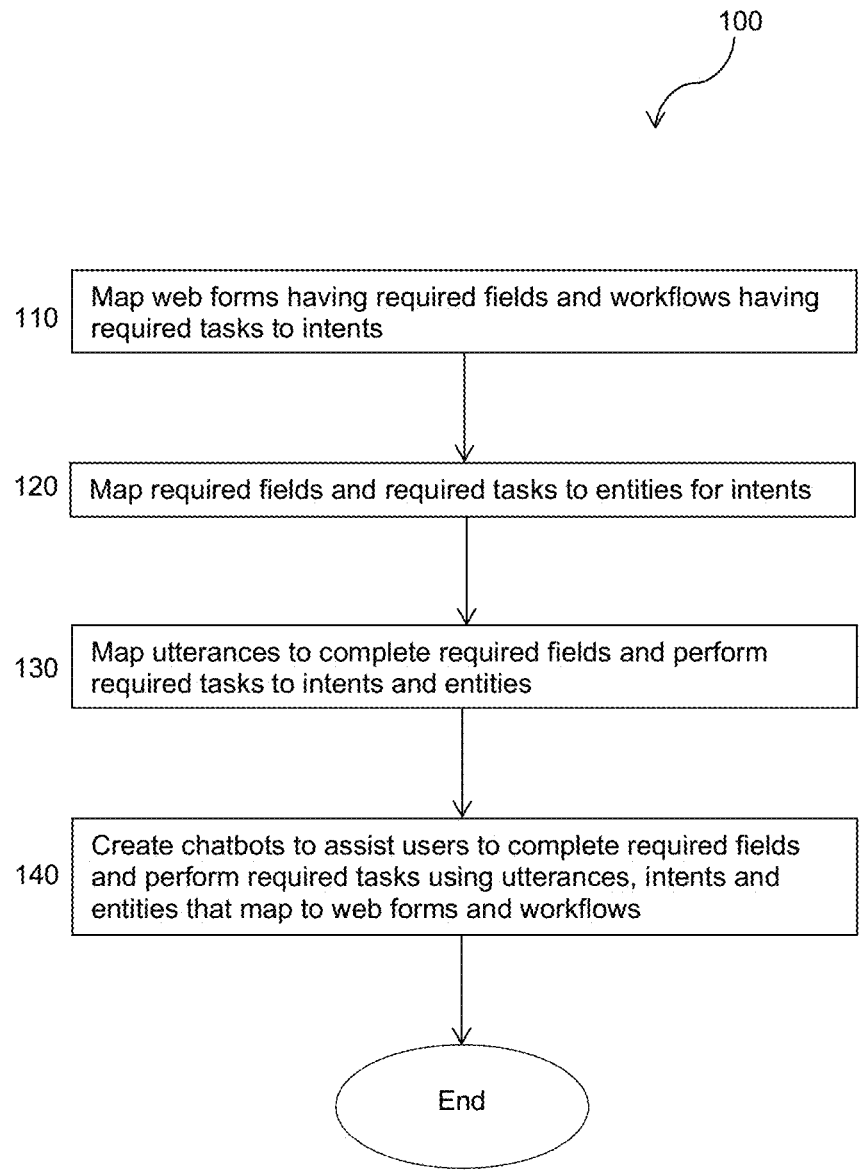
FIG. 1 is an example flow chart of a method for chatbot-enabled web forms and workflows according to an example embodiment of the present invention.

Referring to FIG. 1, an example method 100 for chatbot-enabled web forms and workflows according to an example embodiment of the present invention starts at step 110 by mapping web forms and workflows to intents. The web forms and the workflows may be been respectively pre-defined with required fields to be completed and required tasks to be performed. An intent may represent an action that a user want to perform or the purpose of a user's input, for example, a user wants to apply for leave. Intents may be denoted by the hashtag symbol. In the leave example, web forms and workflows relating to leave applications may be mapped to the intent of #leave. The leave web forms and workflows may have been pre-defined (or created) and published using web form and workflow engines, such as such as Nintex® Forms and Nintex® Workflow.

Next, at step 120, the required fields and the required tasks may be mapped to entities for the intents that map to the web forms and the workflows. An entity may represent a term, data type, object or control that is relevant to a user's intent and that provides specific context for an intent. Entities may use the @symbol. For example, an entity may represent a type of leave, or a start date or end date for the leave.

Next, at step 130, utterances to complete the required fields and perform the required tasks may be mapped to the intents and the entities that map to the web forms and the workflows. An utterance is a phrase or sentence that a user might say that maps to an intent and/or individual entities of the intent. For example, the utterance "I want to go on vacation next Monday" may map to both the intent of #leave and the individual entities of @leave type and @start date.

The method 100 ends at step 140 by creating chatbots configured to assist users to complete the required fields and perform the required tasks using the utterances, the intents and the entities that map to the web forms and the workflows.

The method 100 may further comprise mapping confirmation messages confirming completion of the required fields and performance of the required tasks to the intents and the entities that map to the web forms and the workflows. The confirmation messages may comprise sentences or statements to confirm or verify a user's input for the intents and the entities that map to the web forms and the workflows.

Figure 2:
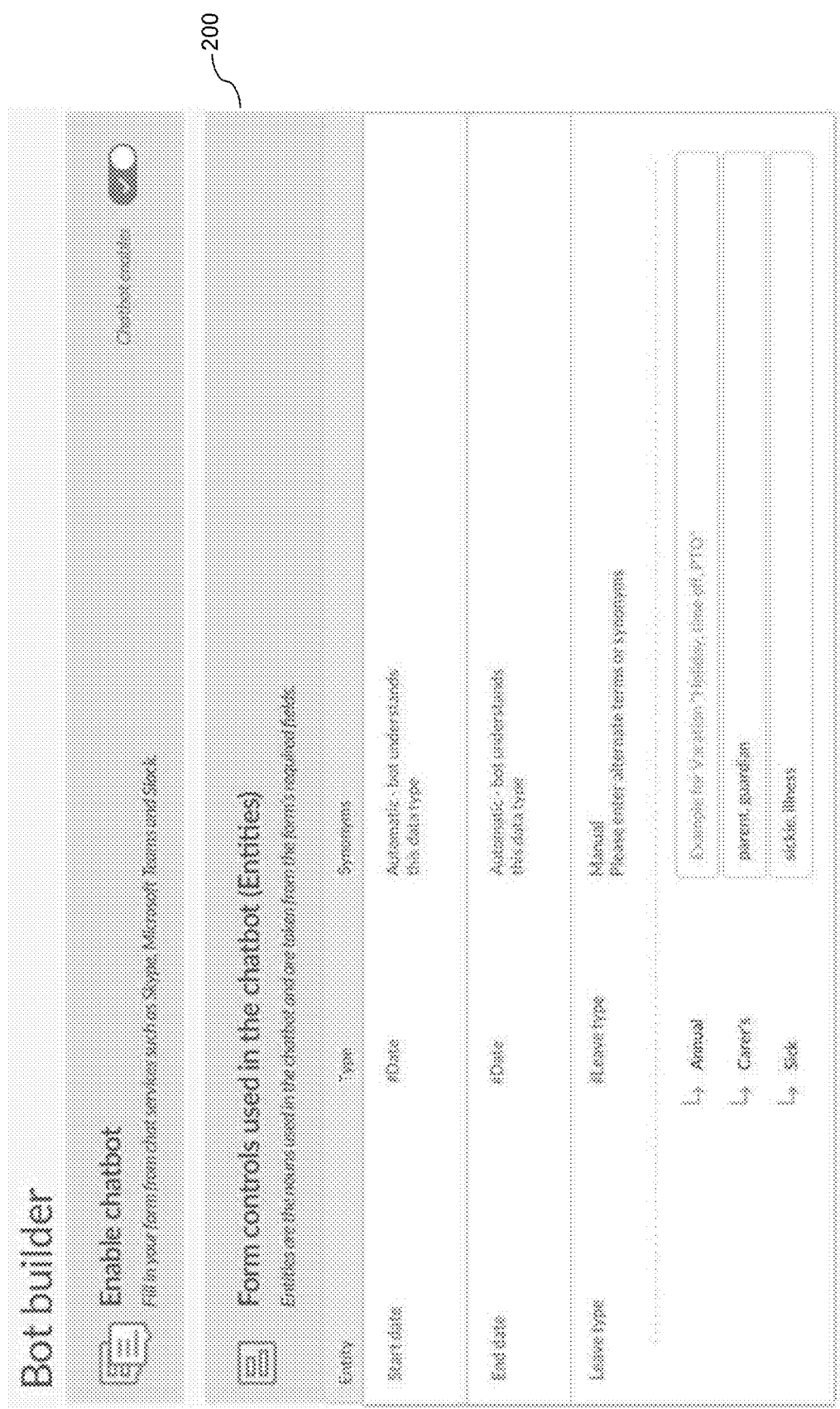
Figure 4:
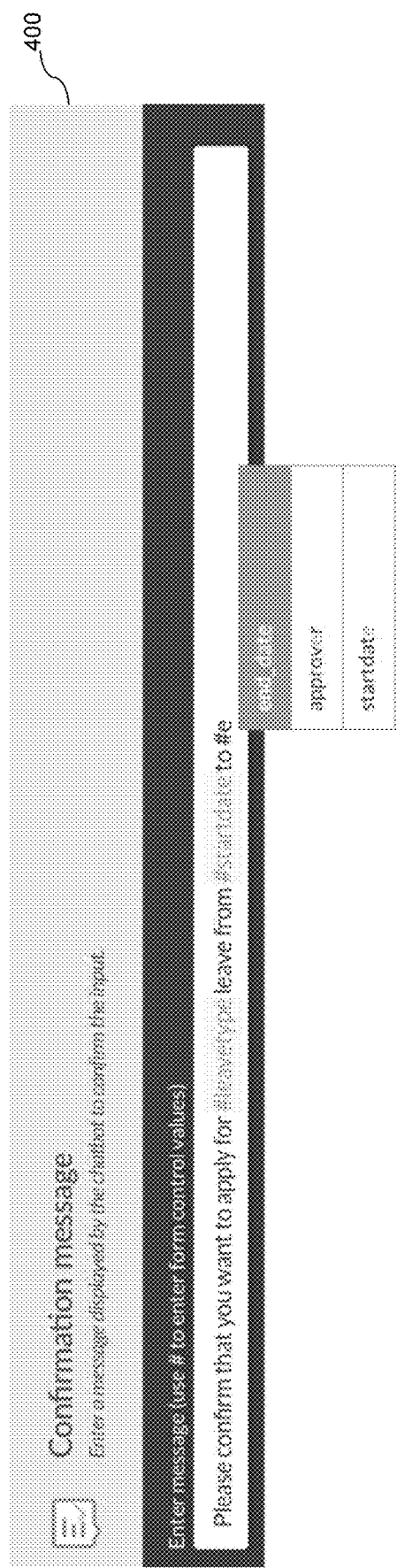

Referring to FIGS. 2 to 4, the mapping of the intents, the entities, the utterances, and the confirmation messages to the web forms and the workflows may be performed using pre-configured GUIs without coding. The GUIs may be implemented in a chatbot creation engine (or bot builder). FIG. 2 illustrates an example GUI 200 for mapping required fields of an example leave application web form to entities. The mapping may be performed automatically by the chatbot creation engine based on predefined mapping rules that automatically map the required fields to the entities, and/or manually map the required fields to the entities based on user input of alternative terms or synonyms.

FIG. 3 illustrates an example GUI 300 for mapping example utterances to complete the required fields to the entities that map to the leave application web form. The mapping may, for example, be performed using automatically generated part-of-speech tags and suggested synonyms.

FIG. 4 illustrates an example GUI 400 for mapping confirmation messages confirming completion of the required fields to the intents and the entities that map to the leave web form. The mapping may, for example, be performed using automatically generated part-of-speech tags and/or suggested synonyms.

Figure 5:
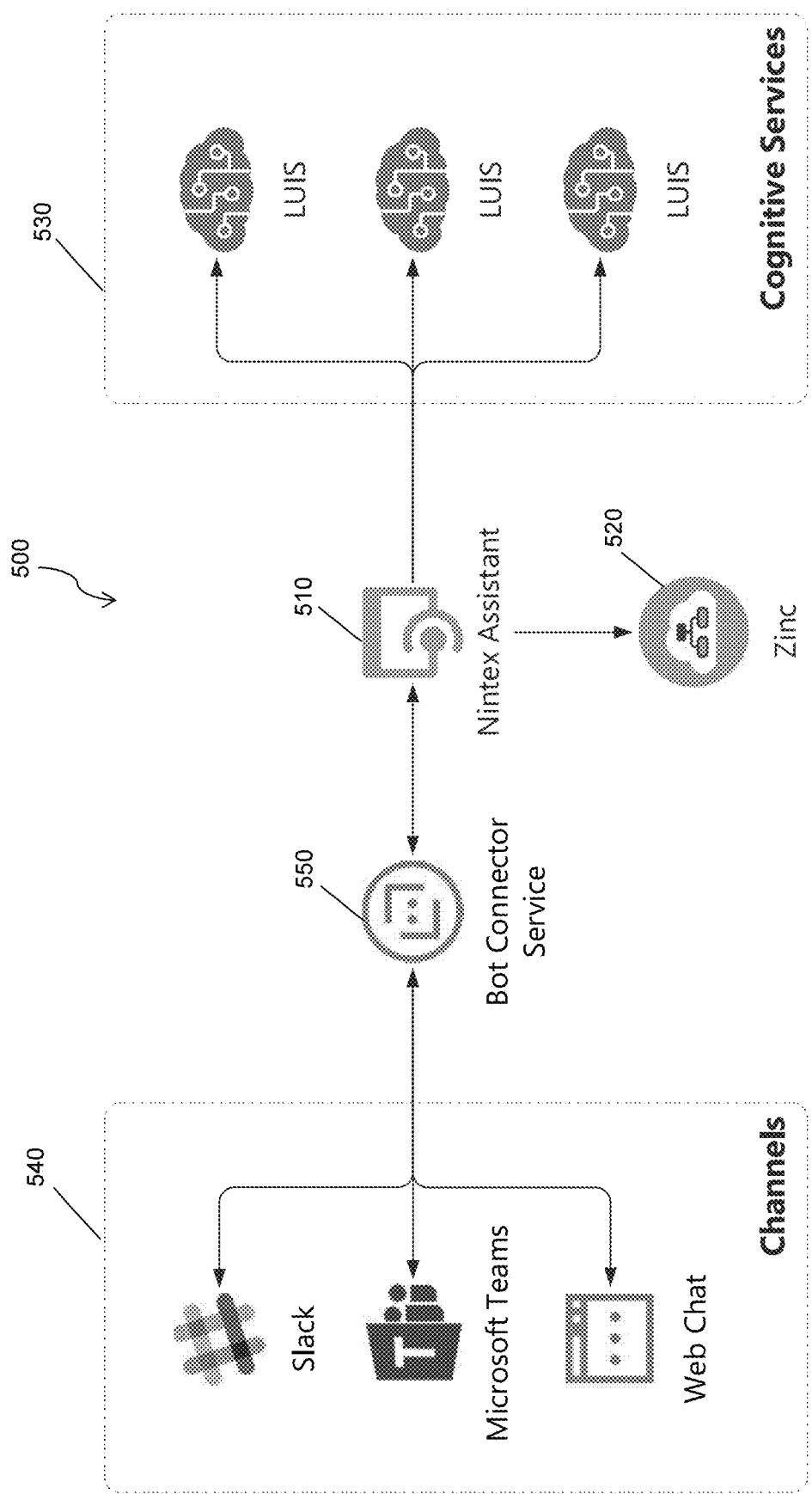
FIG. 5 is an example high level architecture diagram illustrating an example system for chatbot-enabled web forms and workflows according to an example embodiment of the present invention.

FIG. 5 is an example high level architecture diagram illustrating an example system 500 for chatbot-enabled web forms and workflows. The system 500 may comprise a chatbot (or AI assistant) 510 (eg, Nintex® Assistant) for completing web forms and performing workflows created by the method 100 and the no-code chatbot creation engine described above. The chatbot 510 may be connected to web form and/or workflow engines 520 (eg, Nintex® Forms), cognitive services or natural language (NLP) engines 530 (eg, such as Language Understanding Intelligent Service (LUIS)). The chatbot 510 may be deployed in channels 540 via a bot connector service 550. The deployment channels 540 for the chatbot 510 may, for example, comprise team messaging applications (eg, Slack), chat-based hubs for teamwork (eg, Microsoft® Teams), and web chat widgets.

The chatbots 510 created by the method 100 and the chatbot creation engine described above may be further configured to provide additional chat-enabled functionality to users. FIGS. 6 to 9 illustrate example data flows in the system 500 between the chatbot 510, participants 600 in workflows (and/or users of web forms), the NLP engine 530, and the workflow engine 520 for different chatbot-enabled functionalities.

Figure 6:
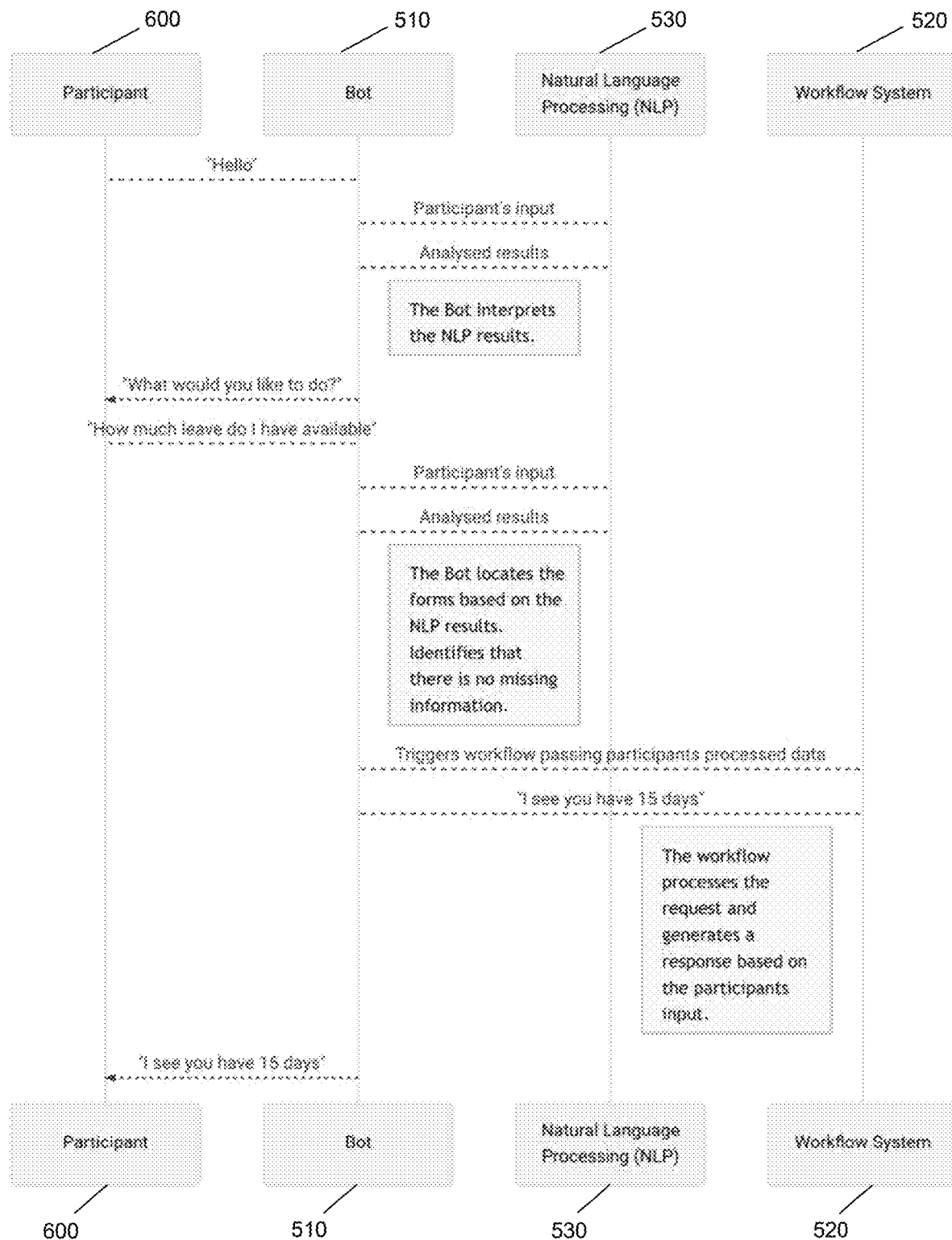
FIGS. 6 to 9 are example data flow diagrams for chatbot-enabled web forms and workflows according to an example embodiment of the present invention.

For example, as illustrated in FIG. 6, the chatbot 510 may be configured to discover or identify the web forms and the workflows in the workflow engine 520 based on the NLP engine 530 recognizing the intents and the entities in the utterances of the participant 600.

Figure 7:
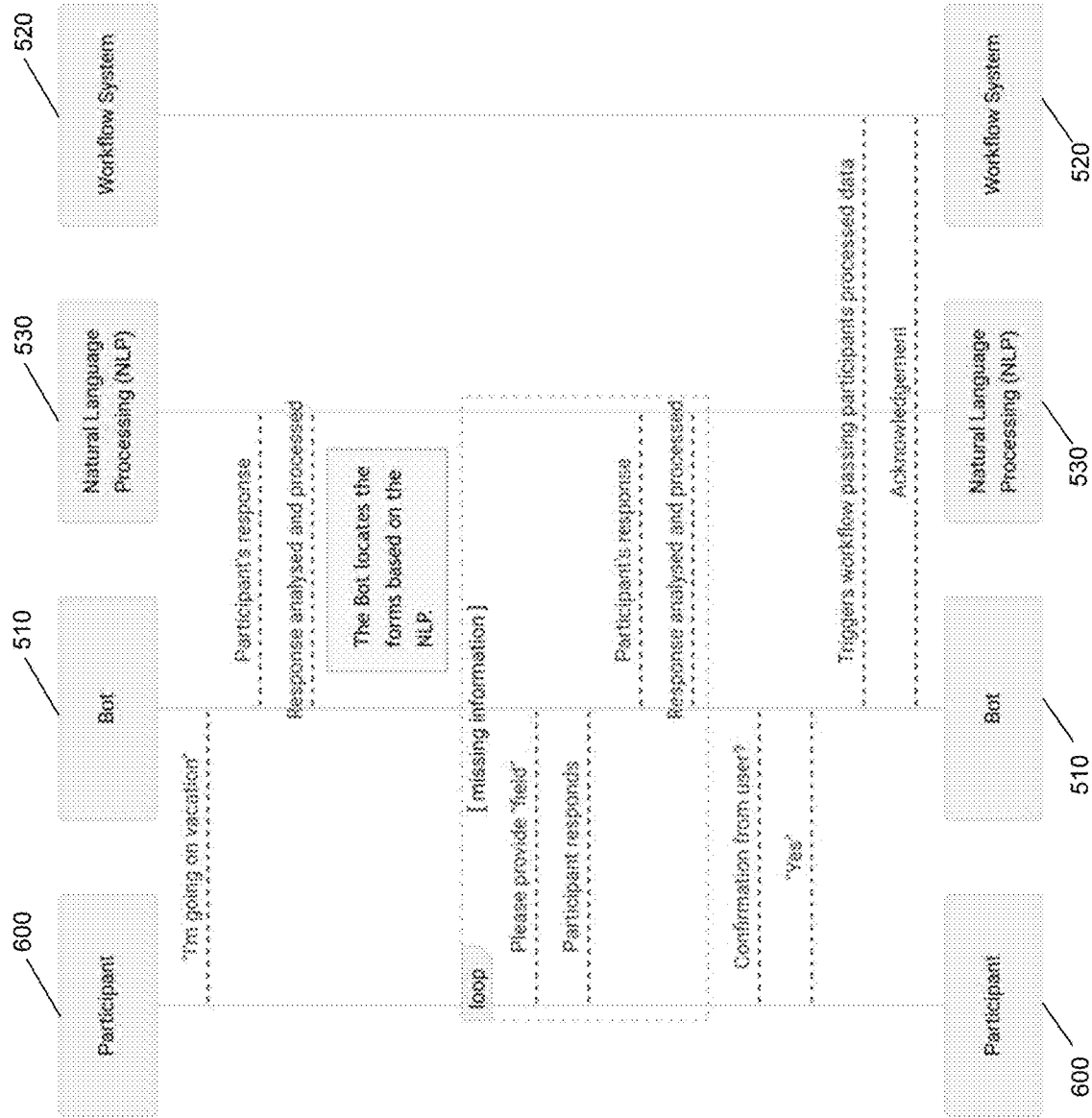
Figure 8:
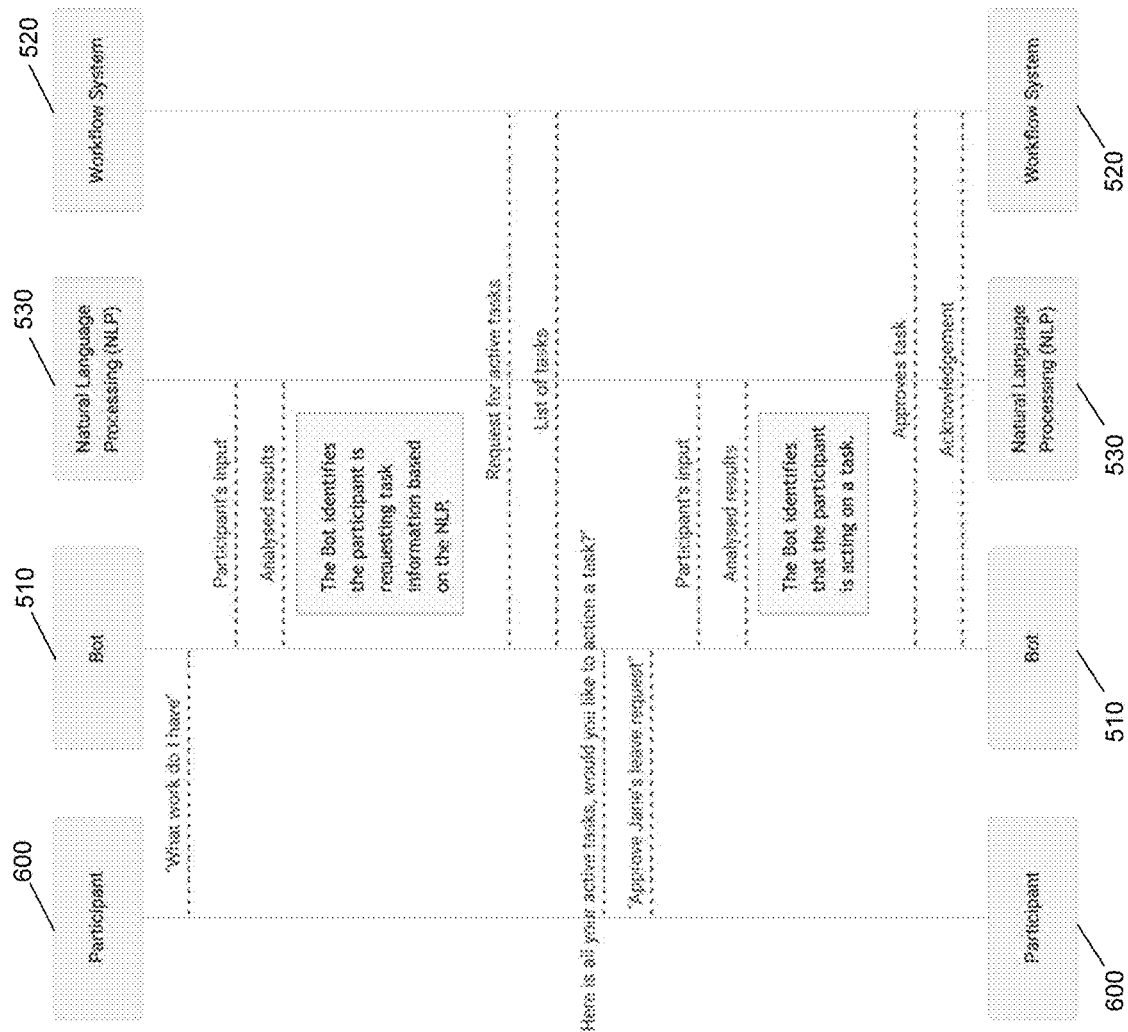

As illustrated in FIGS. 7 and 8, the chatbot 510 may be further configured to identify participants 600 in the workflows, trigger the workflows and performance of the required tasks by the participants 600 in the workflow engine 520 based on the NLP engine 530 recognizing the intents and the entities in the utterances of the participants 600.

Figure 9:
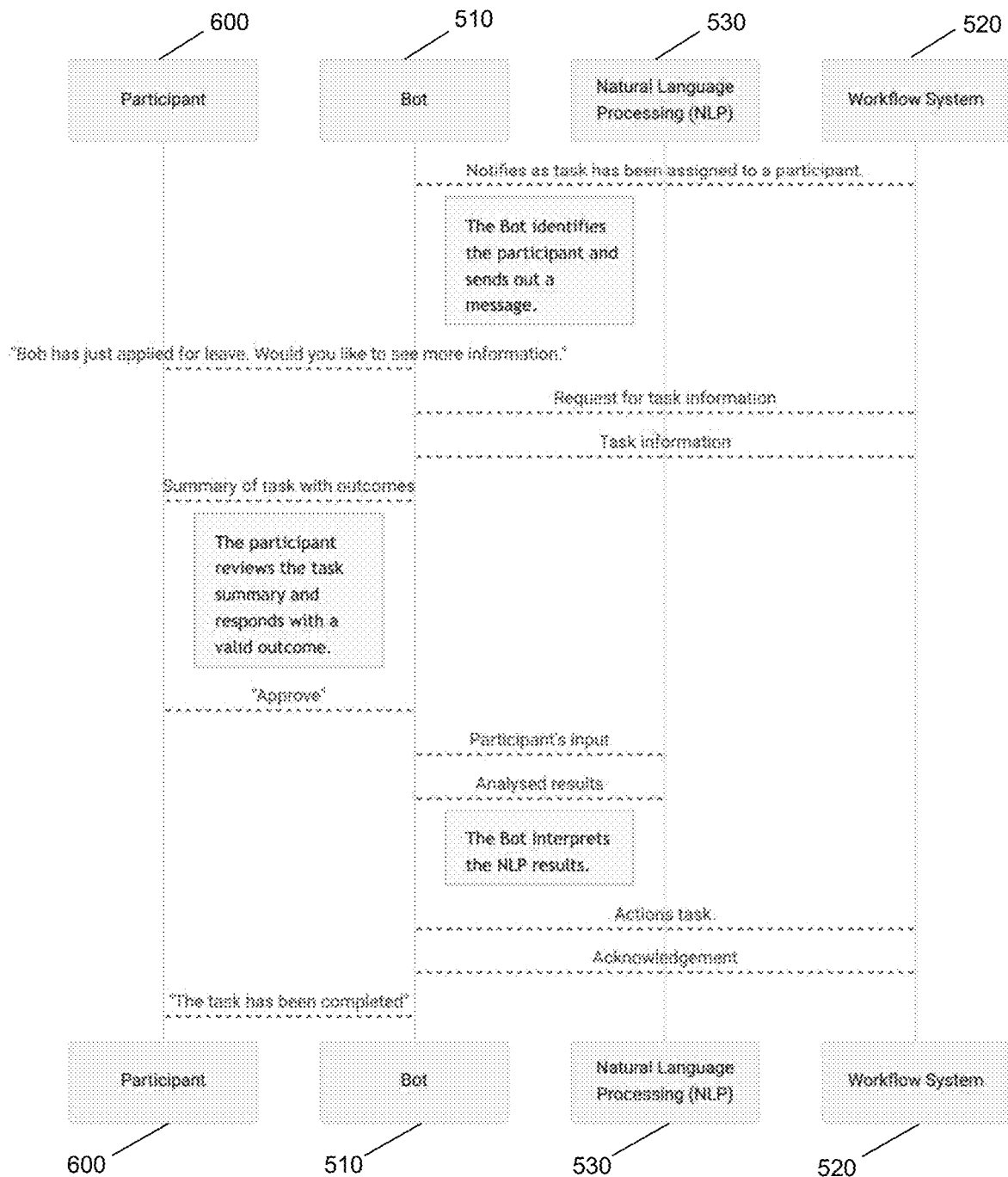

Referring to FIG. 9, the chatbots 510 may be further configured to send messages, initiate reviews, and interpret results or outcomes of workflows and required tasks in the workflow engine 520 based on the NLP engine 530 recognizing the intents and the entities in the utterances of the participants 600.

Embodiments of the present invention provide intuitive, no-code chatbot creation engines that are both generally and specifically useful for chatbot-enabling web forms and workflows.

For the purpose of this specification, the word "comprising" means "including but not limited to," and the word "comprises" has a corresponding meaning.

The above embodiments have been described by way of example only and modifications are possible within the scope of the claims that follow.

What is claimed is:

1. A method for creating chatbot-enabled programmatic web forms and programmatic workflows, the method comprising:

receiving at least a first utterance from a user;
recognizing at least one first intent and at least one first entity from the first utterance, wherein the at least one first entity is associated with fulfilling the at least one first intent;
mapping the recognized to one first intent and the one first entity to multiple programmatic web forms and programmatic workflows to locate a programmatic web form and programmatic workflow, wherein each of the multiple programmatic web forms have required fields to be completed and each of the multiple programmatic workflows have required tasks to be performed;
mapping the recognized one first intent and the one first entity to the required fields and the required tasks of the located programmatic web form and the programmatic workflow;
receiving a second utterance from the user;
recognizing at least one second intent and at least one second entity from the second utterance;
mapping the recognized one second intent and the one second entity to the required fields and the required tasks of the located programmatic web form and the programmatic workflow; and
creating at least one chatbot configured to assist the user to complete the required fields and perform the required tasks using the recognized first intent and first entity of the first utterance and the recognized second intent and second entity of the second utterance.

2. The method of claim 1, wherein the chatbots are further configured to assist the users to discover the programmatic web forms and the programmatic workflows based on the recognizing.

3. The method of claim 2, wherein the chatbots are further configured to trigger the programmatic workflows and performance of the required tasks based on the recognizing.

4. The method of claim 3, wherein the chatbots are further configured to complete the required fields and performance of the required tasks based on the mapping.

5. The method of claim 4, further comprising mapping confirmation messages confirming completion of the required fields and performance of the required tasks.

6. The method of claim 5, wherein the mapping of the intents and the confirmation messages to the programmatic web forms and the programmatic workflows is performed using graphical user interfaces (GUI) without coding.

7. The method of claim 1, wherein the mapping the recognized one second intent and the one second entity to the required fields and the required tasks of the located programmatic web form and the programmatic workflow is performed automatically.

8. A system for creating chatbot-enabled programmatic web forms and programmatic workflows, the system comprising:
a memory to store instructions;
one or more processors to execute instructions stored in the memory to:
receiving at least a first utterance from a user;
recognizing at least one first intent and at least one first entity from the first utterance, wherein the at least one first entity is associated with fulfilling the at least one first intent;
map the recognized one first intent and the one first entity to multiple programmatic web forms and programmatic workflows to locate a programmatic web form and programmatic workflow, wherein each of the multiple programmatic web forms have required fields to be completed and each of the multiple programmatic workflows have required tasks to be performed;
map the recognized one first intent and the one first entity to the required fields and the required tasks of the located programmatic web form and the programmatic workflow;
receiving a second utterance from the user;
recognizing at least one second intent and at least one second entity from the second utterance;
map the recognized one second intent and the one second entity to the required fields and the required tasks of the located programmatic web form and the programmatic workflow; and
create at least one chatbot configured to assist the user to complete the required fields and perform the required tasks using the recognized first intent and first entity of the first utterance and the recognized second intent and second entity of the second utterance.

9. A chatbot for completing programmatic web forms or performing programmatic workflows created by the method of claim 1 or the system of claim 8.

10. A chatbot-enabled programmatic web form or a chatbot-enabled programmatic workflow created by the method of claim 1 or the system of claim 8.

11. A non-transitory machine-readable medium storing instructions which, when executed by one or more processors, cause the one or more processors to perform operations comprising:
receiving at least a first utterance from a user;
recognizing at least one first intent and at least one first entity from the first utterance, wherein the at least one first entity is associated with fulfilling the at least one first intent;
mapping the recognized to one first intent and the one first entity to multiple programmatic web forms and programmatic workflows to locate a programmatic web form and programmatic workflow, wherein each of the multiple programmatic web forms have required fields to be completed and each of the multiple programmatic workflows have required tasks to be performed;
mapping the recognized one first intent and the one first entity to the required fields and the required tasks of the located programmatic web form and the programmatic workflow;
receiving a second utterance from the user;
recognizing at least one second intent and at least one second entity from the second utterance;
mapping the recognized one second intent and the one second entity to the required fields and the required tasks of the located programmatic web form and the programmatic workflow; and
creating at least one chatbot configured to assist the user to complete the required fields and perform the required tasks using the recognized first intent and first entity of the first utterance and the recognized second intent and second entity of the second utterance.

* * * * *